United States Patent
Ferguson et al.

(10) Patent No.: US 12,216,438 B2
(45) Date of Patent: Feb. 4, 2025

(54) SYSTEMS AND METHODS FOR PAIRING SMART DEVICES BASED ON USER INTERACTIONS

(71) Applicant: Hubbell Incorporated, Shelton, CT (US)

(72) Inventors: Eric Ferguson, Simsbury, CT (US); David Edward Davis, West Hartford, CT (US)

(73) Assignee: Hubbell Incorporated, Shelton, CT (US)

( * ) Notice: Subject to any disclaimer, the term of this patent is extended or adjusted under 35 U.S.C. 154(b) by 357 days.

(21) Appl. No.: 17/775,051

(22) PCT Filed: Nov. 6, 2020

(86) PCT No.: PCT/US2020/059412
§ 371 (c)(1),
(2) Date: May 6, 2022

(87) PCT Pub. No.: WO2021/092381
PCT Pub. Date: May 14, 2021

(65) Prior Publication Data
US 2022/0390910 A1  Dec. 8, 2022

Related U.S. Application Data

(60) Provisional application No. 62/931,383, filed on Nov. 6, 2019.

(51) Int. Cl.
*H04B 7/00* (2006.01)
*G05B 15/02* (2006.01)
*G06F 3/04815* (2022.01)

(52) U.S. Cl.
CPC ......... *G05B 15/02* (2013.01); *G06F 3/04815* (2013.01); *G05B 2219/2642* (2013.01)

(58) Field of Classification Search
CPC ............ G05B 15/02; G05B 2219/2642; G06F 3/04815
See application file for complete search history.

(56) References Cited

U.S. PATENT DOCUMENTS 6,912,507 B1 * 6/2005 Phillips .............. G06Q 30/0639
705/26.8
8,170,486 B2 * 5/2012 Olofsson ............. H04M 1/6091
455/41.3

(Continued)

OTHER PUBLICATIONS

International Search Report and Written Opinion mailed in Application No. PCT/US2020/059412, dated Feb. 4, 2021.

*Primary Examiner* — Stephen M D Agosta
(74) *Attorney, Agent, or Firm* — Robinson + Cole LLP

(57) ABSTRACT

Systems and methods for pairing smart devices are provided. A method can include receiving image data indicative of an environment. The method can include identifying a plurality of devices physically located in the environment and generating a virtual representation of the environment based on the image data. The virtual representation can include a device representation for each respective device of the plurality of devices physically located in the environment. The method can include providing for display, via a display device, data indicative of a user interface. The user interface can present the virtual representation of the environment. The method can include receiving user input indicative of a pairing intention of a first device and second device and, in response, initiating a pairing operation between the first and second device. In this manner, the systems and methods can allow user to easily pair devices using a simple user-interaction.

20 Claims, 8 Drawing Sheets

(56) References Cited

U.S. PATENT DOCUMENTS

| | | | | |
|---|---|---|---|---|
| 8,433,243 B2* | 4/2013 | Sharma | | H04M 1/05 455/41.3 |
| 8,768,252 B2* | 7/2014 | Watson | | H04R 3/00 455/3.06 |
| 8,923,747 B2* | 12/2014 | Tan | | H04H 60/23 455/41.3 |
| 9,544,689 B2* | 1/2017 | Fisher | | G06F 3/165 |
| 9,820,323 B1* | 11/2017 | Young | | H04W 4/80 |
| 10,447,841 B2* | 10/2019 | Eichfeld | | H05B 47/19 |
| 10,524,300 B2* | 12/2019 | Ueda | | H04W 4/80 |
| 10,728,647 B2* | 7/2020 | Gong | | H04L 12/42 |
| 10,764,683 B2* | 9/2020 | Bal | | H04R 3/12 |
| 10,784,993 B1* | 9/2020 | Batra | | H04L 49/90 |
| 11,057,911 B2* | 7/2021 | Wang | | H04W 76/15 |
| 11,095,764 B1* | 8/2021 | Han | | H04B 5/00 |
| 11,210,932 B2* | 12/2021 | Norris | | H04W 8/005 |
| 11,233,836 B2* | 1/2022 | Fornshell | | H04L 65/611 |
| 11,259,347 B2* | 2/2022 | James | | H04R 1/1091 |
| 11,350,264 B2* | 5/2022 | Chen | | G06F 3/0482 |
| 11,494,159 B2* | 11/2022 | Tsui | | H04M 1/72412 |
| 11,847,378 B2* | 12/2023 | Sanders | | G06F 3/04842 |
| 11,983,551 B2* | 5/2024 | Carrigan | | G06F 3/0488 |
| 2006/0128306 A1* | 6/2006 | Jung | | H04W 4/16 455/41.2 |
| 2008/0271158 A1* | 10/2008 | Kamperman | | H04N 21/43615 726/27 |
| 2010/0106662 A1* | 4/2010 | Ramaswamy | | G01C 21/20 705/323 |
| 2010/0272082 A1* | 10/2010 | Niranjan | | H04L 45/20 370/400 |
| 2012/0087503 A1* | 4/2012 | Watson | | H04S 3/008 381/23 |
| 2014/0220897 A1* | 8/2014 | Wan | | H04W 12/50 455/41.2 |
| 2015/0133051 A1 | 5/2015 | Jemal-Syed et al. | | |
| 2016/0217617 A1* | 7/2016 | Barribeau | | G06F 3/1268 |
| 2017/0206369 A1* | 7/2017 | Hu | | H04W 4/80 |
| 2018/0124552 A1* | 5/2018 | Cho | | H04W 4/80 |
| 2020/0241829 A1* | 7/2020 | Long | | G06F 3/16 |
| 2021/0072953 A1* | 3/2021 | Amarilio | | G10L 15/22 |
| 2022/0124415 A1* | 4/2022 | Lee | | H04S 7/30 |
| 2023/0093087 A1* | 3/2023 | Babinowich | | G06F 3/04815 345/423 |

* cited by examiner

SYSTEMS AND METHODS FOR PAIRING SMART DEVICES BASED ON USER INTERACTIONS

REFERENCE TO RELATED APPLICATIONS

This application claims benefit of prior-filed, U.S. Provisional Patent Application No. 62/931,383, filed Nov. 6, 2019, the entire contents of which are incorporated by reference.

FIELD

The present disclosure relates generally to pairing one or more smart devices via one or more user interactions.

BACKGROUND

Smart devices can include devices that can communicate and/or be controlled by device(s) located remotely from the smart devices. Example smart devices can include power switches and/or various interactive devices, such as electronics, light sources, appliances, power outlets, and other devices. With the advance of Internet of Things (IoT) technology, smart devices such as power switches and other in-wall devices can communicate with other electronic devices over one or more communication links. For instance, smart devices can be capable of communicating using communication technologies, such as Bluetooth low energy, Bluetooth mesh networking, near-field communication, Wi-Fi, Zigbee, Ethernet, etc.

SUMMARY

Aspects and advantages of embodiments of the present disclosure will be set forth in part in the following description, or may be learned from the description, or may be learned through practice of the embodiments.

One example aspect of the present disclosure is directed to a method for pairing smart devices based on user interactions. The method can include receiving, by one or more computing devices, image data indicative of an environment. The method can include identifying, by the one or more computing devices, a plurality of devices physically located in the environment. The method can include generating, by the one or more computing devices, a virtual representation of the environment based, at least in part, on the image data. For example, the virtual representation can include a device representation for each respective device of the plurality of devices physically located in the environment. The method can include providing for display, by the one or more computing devices via a display device, data indicative of a user interface. For instance, the user interface can present the virtual representation of the environment. The method can include receiving, by the one or more computing devices, user input indicative of a pairing intention of a first device of the plurality of devices and a second device of the plurality of devices. The method can include initiating, by the one or more computing devices, a pairing operation between the first device and the second device based, at least in part, on the user input indicative of the pairing intention of the first device of the plurality of devices and the second device of the plurality of devices.

Other examples aspects of the present disclosure are directed to apparatus, methods, electronic devices, non-transitory computer-readable media, and systems. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
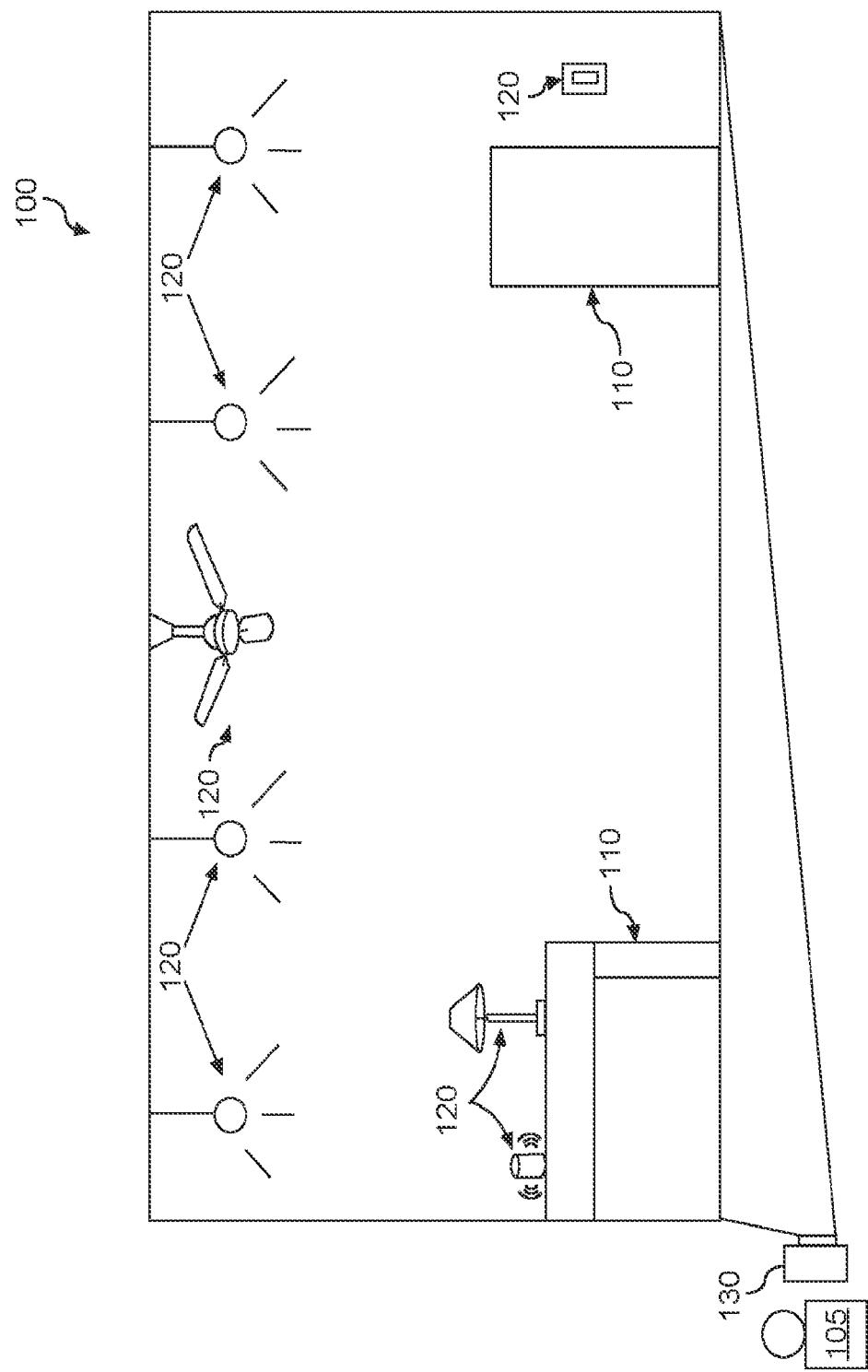
FIG. 1 depicts an example environment according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment, Thus, it is intended that aspects of the present disclosure cover such modifications and variations.

Example aspects of the present disclosure are directed to improved systems and methods for pairing one or more of a plurality of devices within an environment. In particular, example systems and methods of the present disclosure can provide an interface capable of generating a virtual representation of a plurality of devices within an environment based on image data of the environment. The interface can present the virtual representation of the environment and the plurality of devices such that a user may interact with the plurality of devices within the environment. For instance, the interface can be configured to receive user-interactions such as, for example, a drag-and-drop interaction from a first device (e.g., a smart switch) to a second device (e.g., a smart bulb) and respond to such interactions by initiating a pairing operation between the first and second device. In this way, the user interface can generate a virtual representation mirroring, at least partly, a live image of multiple devices within an environment and allow a user to interact with the representation to establish relationships between two or more of the devices. Ultimately, this can allow the user to trigger a pairing operation between the at least two devices with a simple user-interaction.

The example systems and methods described herein may provide a number of technical benefits. For instance, the provision of an interactive user device via which visual content displayed in a user interface presents a virtual representation of an environment with a plurality of devices can be adapted to provide an efficient and intuitive means for interacting with and establishing relationships with each of the plurality of devices. Moreover, presenting each device at a respective position within a virtual environment mirroring that of a live image allows a user to visualize such interactions in a simplistic and realistic manner. This intuitive user interface may increase a user's awareness of the plurality of devices within an environment and the relationships therebetween. In addition, this can reduce the number of user inputs required by the user to establish a relationship, such as a pairing relationship, between at least two of the devices, and so may reduce the amount of processing associated with handling the user inputs. As a result of the intuitive nature of the user interface culminating in a reduced number of inputs, the user may be able to spend less time using the application which may reduce screen-on time, thereby reducing power usage of a user device (running the application).

Example aspects of the present disclosure can provide a number of improvements to smart device and internet of things (IoT) technology. For instance, the systems and methods according to example aspects of the present disclosure provide an improved approach for pairing at least two devices within an environment. For example, a computing system can receive image data indicative of the environment. The computing system can identify a plurality of devices physically located in the environment. The computing system can generate a virtual representation of the environment based, at least in part, on the image data. The virtual representation can include a device representation for each respective device of the plurality of devices physically located in the environment. The computing system can provide for display, via a display device, data indicative of a user interface. The user interface can present the virtual representation of the environment. The computing system can receive user input indicative of a pairing intention of a first device of the plurality of devices and a second device of the plurality of devices and initiate a pairing operation between the first device and the second device.

In this manner, aspects of the present disclosure presents an improved user interface for computing devices. Unlike conventional user interface methods, the computing system employs an improved user-interface that is capable of realistically displaying a plurality of devices within an environment, receiving input identifying at least two of the plurality of devices, and initiating an operation between the at least two devices based on the input. In this manner, the computing system can increase the speed and simplicity of establishing a relationship between two devices by reducing the complexity of user interactions required to initiate a new device relationship. As a result, the disclosed technology can improve the efficiency of establishing relationships between two or more devices; thereby, improving the functioning of IoT technology in general by enabling the establishment of relationships between smart devices via simplified user interactions.

For instance, FIG. 1 depicts example environment 100 according to example embodiments of the present disclosure. Environment 100 can include any space with one or more devices. For example, the environment 100 can include a portion of a structure such as, for example, a building, fence, etc. The portion of the structure can include one or more rooms, sections, etc. of the structure. For example, the environment 100 can include an office (and/or a portion of the office) of an office building, a living room (and/or a portion of the living room) of a house, a walled-off section (and/or a portion of that section) of a courtyard, etc. The environment 100 can include a plurality of noninteractive objects 110 (e.g., couches, tables, carpet, rugs, windows, doors, trees, etc.) and/or a plurality of interactive objects (e.g., switches (e.g., light switches, etc.), luminaries, fans, electronic doors (e.g., garage door), media/audio devices, smart hubs, etc.). In some implementations, the plurality of interactive objects can include a plurality of smart devices. Smart devices, for example, can include a plurality of devices 120 capable of communicating with one or more remote devices. For example, a smart device can include one or more switches, luminaries, ceiling fans, media devices, audio devices, cleaning devices, smart hubs, etc.

By way of example, a smart device can include one or more processors and one or memory devices. The one or more processors can execute computer-readable instructions stored in the one or more memory devices to provide desired functionality. Example functionality can include communicating with other devices over one or more communication links. For instance, each smart device (e.g., a lighting fixture, ceiling fan, appliance, electronic device, electrical outlet, home device, etc.) of a plurality of devices 120 can communicate with an electrical load to control operation of the electrical load. In addition, or alternatively, a smart device can communicate with one or more other computing devices (e.g., servers, cloud computing devices, user devices such as smartphones, tablets, wearable devices, etc.) to receive data, access processing resources, store data, receive user input or controls, access models, access services (e.g., digital audio assistant services, etc.), receive software updates or other updates, etc.

Each device in the plurality of devices 120 can communicate over one or more communication technologies and/or protocols. Example communication technologies and/or protocols can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, HaLow, cellular communication, LTE, low-power wide area networking, VSAT, Ethernet, MoCA (Multimedia over Coax Alliance), PLC (Power-line communication), DLT (digital line transmission), etc. Other suitable communication technologies and/or protocols can be used without deviating from the scope of the present disclosure.

Figure 2:
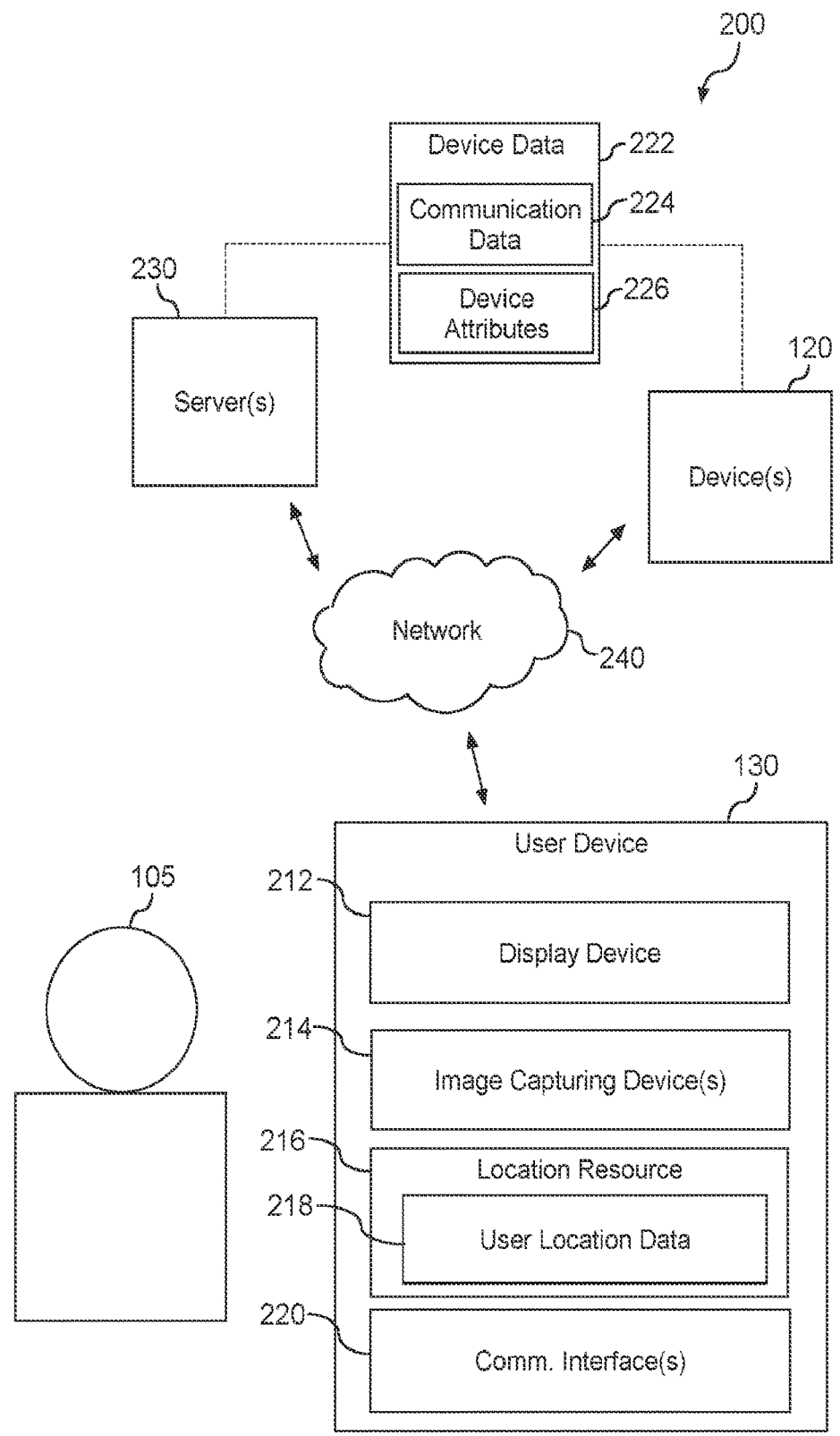
FIG. 2 depicts a block diagram of an example computing system according to example embodiments of the present disclosure.

In some embodiments, a user 105 can interface with a smart device via a user device 130 connected to the smart device via a communication link. For instance, a user 105 can access an application implemented on a user device 130 (e.g., a smartphone, tablet, laptop, wearable device, display with one or more processors, etc.). The application can present a graphical user interface or other user interface (e.g., audio interface) to a user 105, as further described herein. The user 105 can interact with the graphical user interface to control settings and/or operation of the smart device. For example, and as described in more detail herein, the user 105 can interact with the user interface to pair two or more smart devices. Signals associated with the user interaction can be communicated to the smart device, for instance, over a network to control and/or adjust settings of the smart device. In addition, and/or in the alternative, data collected by the smart device (e.g., device data, one or more communication connections, pairing information, etc.) can be communicated to the user device 130 for presentation to the user 105, FIG. 2 depicts a block diagram of one or more devices in an example system 200 according to example embodiments of the present disclosure. For example, the system can include a user device 130, the plurality of device(s) 120 (e.g., as in environment 100, etc.), and/or one or more remote server(s) 230. The user device 130 can include a display device 212, one or more image capturing devices 214 (e.g., camera(s), etc.), one or more location resources 216, user location data 218, one or more communication interface(s) 220, and/or other components.

The user device 130 can be configured to receive image data indicative of an environment such as, for example, environment 100 of FIG. 1. For example, the user device 130 can include image capturing device(s) 214 configured to capture image data. For instance, the one or more image capturing device(s) 214 can be operated by the user 105 via one or more input devices (e.g., buttons, UI elements, microphone/voice input control, gesture sensor, etc.) of the user device 130. In this manner, the user 105 of the user device 130 can control the user device 130 (e.g., one or more camera(s) of the user device 130) to capture one or more images of the environment. The user device 130 can receive image data indicative of the environment based, at least in part, on the one or more images captured via the user device 130. In addition, or alternatively, in some implementations, the user device 130 can receive image data indicative of the environment from one or more remote devices such as, for example, device(s) 120, server(s) 230, etc. For example, server(s) 230 can be configured to obtain image data indicative of the environment and transmit the image data to the user device 130.

The user device 130 can identify a plurality of devices 120 physically located in the environment. For instance, the plurality of devices 120 can be depicted by the one or more images. The user device 130 can identify the plurality of devices 120 based, at least in part, on the image data indicative of the environment (e.g., via one or more image processing techniques), location data associated with the user device 130 (e.g., user location data 218), location data associated with the plurality of devices 120, wireless communication signals (e.g., Bluetooth data, Wi-Fi data, etc.), and/or other data.

For example, the user device 130 can analyze the image data to identify one or more of the plurality of devices 120. By way of example, the user device 130 can utilize one or more image processing techniques to identify one or more of the plurality of devices 120. For instance, the user device 130 can isolate one or more identifiable shapes represented by the image data. The user device 130 can identify one or more of the plurality of devices based, at least in part, on the one or more identifiable shapes. For instance, the user device 130 can access (e.g., via a local memory, a remote memory, etc.) data indicative of one or more shape template(s) that are representative of the types of devices that may be physically located within the environment. The user device 130 can match the identified shaped with a shape template to determine a confidence level that indicates the likelihood that the identified shape is representative of the type of device associated with the shape template. In the event the confidence level is above a threshold (e.g., 95%, etc.), the user device 130 can identify the device associated with the identified shape as the type of device represented in the matched shape template.

In addition, or alternatively, the user device 130 can identify the plurality of devices 120 physically located in the environment based, at least in part, on communication signals such as, for example, radio signals comprising one or more of Bluetooth, Bluetooth Low Energy (BLE), Wi-Fi, etc. For example, radio waves utilized by each of the plurality of devices 120 to communicate can propagate in all directions and may be detected with properly configured antennas. The user device 130 can identify one or more of the plurality of devices 120 physically located in the environment by detecting radio waves transmitted front each of the one or more devices. For example, the radio waves transmitted from each of the one or more devices can include a device identifier, device location, and/or any information indicative of a respective device or a location of the respective device. Moreover, in some implementations, the user device 130 can be configured to only detect certain radio waves within a predetermined distance (e.g., 10 ft, 15 ft, 20 ft, etc.) from the user device 130. In this manner, the user device 130 can determine that a respective device is physically located in the environment based, at least in part, on the act of receiving a radio wave transmitted by the respective device.

In some implementations, the user device 130 can identify one or more of the plurality of devices based, at least in part, on the user location data 218 associated with the user device 130. For example, the user device 130 can include one or more location-based resources 216 configured to receive user location data 218 associated with the user device 130. By way of example, the one or more location-based resources 216 can include one or more sensors such as a global positioning sensor (e.g., GPS), an inertial measurement sensor (IML), motion sensor, and/or any position sensor capable of collecting location information. For instance, in some implementations, the user location data 218 can include GPS coordinates.

In addition, in some implementations, each respective device of the plurality of devices 120 can be associated with device data 222 indicative of one or more device attribute(s) 226 and/or communication data 224. The one or more device attribute(s) 226, for example, can include one or more device feature(s) and/or a device location. Device features, for example, can include one or more physical features (e.g., one or more identifiable shapes (e.g., shape template(s)), colors, patterns, etc.), functionalities (e.g., lighting, audio, tactile, input/output capabilities, etc.), and/or configurations (e.g., one or more name(s)/label(s), linked user(s)/account(s), linked device(s), device grouping(s), etc) of a respective device. A device location can include one or more physical and/or relative locations of the respective device. For example, the device location can include a specific physical location (e.g., GPS coordinates, etc.) of the device. In addition, or alternatively, the device location can include a relative location (e.g., a specific room relative to a house, a specific location within a room, etc.) of the device.

The device data 222 can be stored on local memory onboard a respective device, on one or more servers 230 remote from the respective device, and/or on the user device 130. For example, in some implementations, the device data 222 for each respective device of the plurality of devices 120 can be previously received via user input at the user device 220. By way of example, the user device 220 can be configured to set up each of the plurality of devices 120. During the set up process, a user can input one or more device feature(s) 222 to the user device 130 (e.g., via a touch screen, keyboard, menu selection input, etc.). The user device 130 can store the device feature(s) in local memory, and/or provide the device feature(s) to a respective device and/or remote server 230 for storage.

In some implementations, the user device 130 can identify the plurality of devices 120 physically located in the environment based, at least in part, on the user location data 218 and the device location data associated with each respective device of the plurality of devices 120. For instance, the user device 130 can obtain device data 222 associated with each respective device of the plurality of devices 120. By way of example, the user device 130 can include one or more communication interface(s) 220. The one or more communication interface(s) 220 can be configured to communicate (e.g., over network 240) with one or more remote server(s) 230, each of the plurality of devices 120, etc. In this manner, the user device 130 can obtain device data 222 for each of the plurality of devices 120 from each of the plurality of devices 120, from one or more remote services 230, etc.

The device data 222 can include a device location for each respective device of the plurality of devices. The user device 130 can compare the user location data 218 associated with the user device 130 to the device location data associated with each respective device of the plurality of devices 120 to identify the plurality of devices 120 physically located in the environment. For instance, a respective device can be included in the identified plurality of devices 120 if it is determined that the device location is within a threshold distance (e.g., 10 ft, 15, ft, 20 ft, etc.) from the user location data 218. In another example, the user device 130 can determine that the user is located within a particular room by comparing the user location data. 218 and map data of the building. The user device 130 can identify which of the device(s) 120 are located within the room based, at least in part, on the device data 222, which may include a semantic room label (e.g., entered during device set up, etc.).

In some implementations, the device data 222 for each respective device of the plurality of devices 120 can be obtained based on device image data. For example, as described above, the user device 130 can identify each respective device of the plurality of devices 120 by processing the image data indicative of the environment. Additionally, in some implementations, the user device 130 can receive, via the one or more image capturing device s) 214, device image data indicative of each respective device of the plurality of devices 120 physically located within the environment.

By way of example, the user device 130 can be configured to provide a prompt to a user of the user device 130. The prompt can include data indicative of a respective device of the plurality of devices 120. For example, the prompt can identify a respective device and request device image data for the respective device. The device image data can include one or more close up images of a respective device. For example, the device image data can include one or more images depicting the respective device and/or one or more portions of the respective device. In some implementations, a user of the user device 130 can utilize the one or more image acquisition device(s) 214 of the user device 130 to obtain the device image data. For example, the user can obtain the device image data in response to the prompt by capturing one or images of the respective device.

The user device 130 can determine the device data 222 for each respective device of the plurality of devices 120 based, at least in part, on the device image data for each respective device of the plurality of devices 120. For example, one or more of the plurality of devices 120 can include a housing with one or more portions. In some implementations, the device data 222 for a respective device can be encoded on one or more portions of the housing for the respective device. By way of example, the housing of a respective device can include an encoding pattern such as, for example, a universal product code (e.g., barcode, etc.), QR code, NFC tag, etc. The user device 130 can determine the device data 222 by decoding the encoding pattern on the one or more portions of a respective device's housing and/or by communicating the pattern to the server(s) 230 and receiving data indicative of the device in response.

Figure 3:
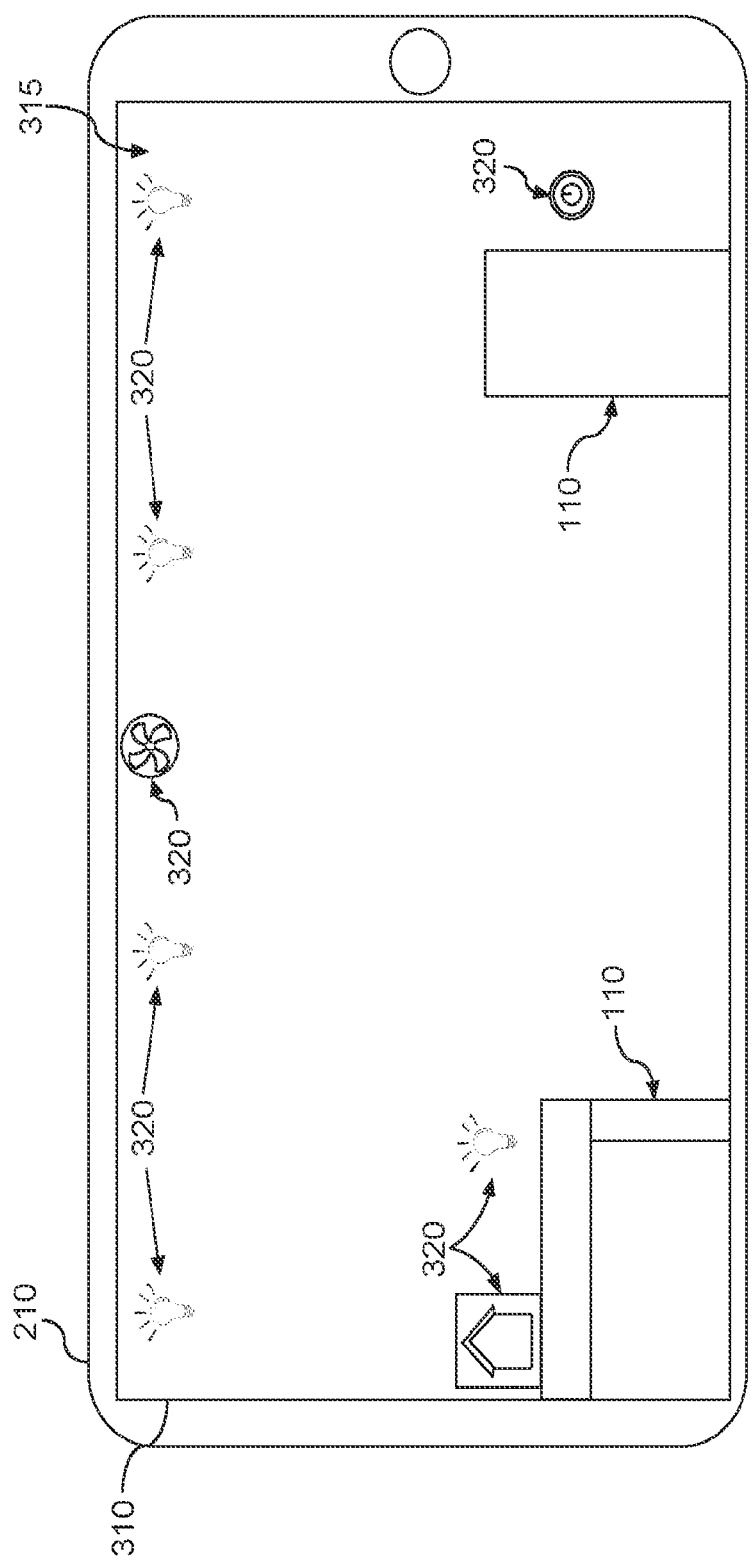
FIG. 3 depicts an example user-interface presenting a virtual environment according to example embodiments of the present disclosure.

The user device 130 can provide for display, data indicative of the environment via the display device 212. For instance, FIG. 3 depicts an example user-interface 310 presenting a virtual representation 315 of the environment 100 according to example embodiments of the present disclosure. For example, the user device 130 can generate a virtual representation 315 of the environment based, at least in part, on the image data. The virtual representation 315 of the environment can include a representation of the plurality of noninteractive objects 110 and/or the plurality of interactive objects physically located in the environment. For example, the virtual representation 315 can include virtual data presenting the environment, each of the plurality of noninteractive objects 110 in the environment, and each of the interactive objects in the environment. In some implementations, the virtual representation 315 can provide a virtual reality or augmented reality environment.

In some implementations, the virtual representation 315 can include one or more device representations 320 for each device of the plurality of devices physically located in the environment. For example, the virtual representation 315 of the environment can include a device representation 320 for each respective device of the plurality of devices physically located in the environment. In this regard, the user device 130 can generate the device representation 320 for each respective device of the plurality of devices. For example, the user device 130 can generate the device representation 320 for a respective device based on the device attribute(s) associated with the respective device.

By way of example, the device attribute(s) for a respective device can include an indication of a device type. The device type can be determined based, at least in part, on one or more device attributes such as, for example, an identifiable shape, etc. In some implementations, the device representation 320 for a respective device can be generated based on the device type. For instance, lighting devices (e.g., associated with a lighting device type) such as, for example, lightbulbs, lamps, etc. can share a same or similar device representation 320 (e.g., a light bulb) indicative of the device type. In addition, or alternatively, the device representation 320 for each respective device of the plurality of devices can include a unique representation indicative of the respective device. In this manner, a user of the user device 130 can identify each respective device of the plurality of devices within the virtual environment 315. By way of example, the device representation for a ceiling fan can be different than that of a device representation for an overhead/ceiling light.

The user device 130 can provide for display, data indicative of the user-interface 310. For example, the user-interface 310 can present the virtual representation 315 of the environment. In addition, or alternatively, the user-interface 310 can present the device representation 320 for each respective device of the plurality of devices within the virtual representation 315 of the environment. For example, the user-interface 310 can present a virtual representation 315 of the environment overlaid by each of the plurality of device representations 320. By way of example, the device representation 320 for each respective device can be provided for display at a virtual position within the virtual environment 315. In some implementations, the virtual position within the virtual environment 315 for the device representation 320 of a respective device can be determined based on location data associated with the respective device, as determined by the user device 130, etc. In this manner, the virtual representation 315 of the environment can include device representations 320 realistically concatenated within at least a near mirror-image of the environment.

Figure 4:
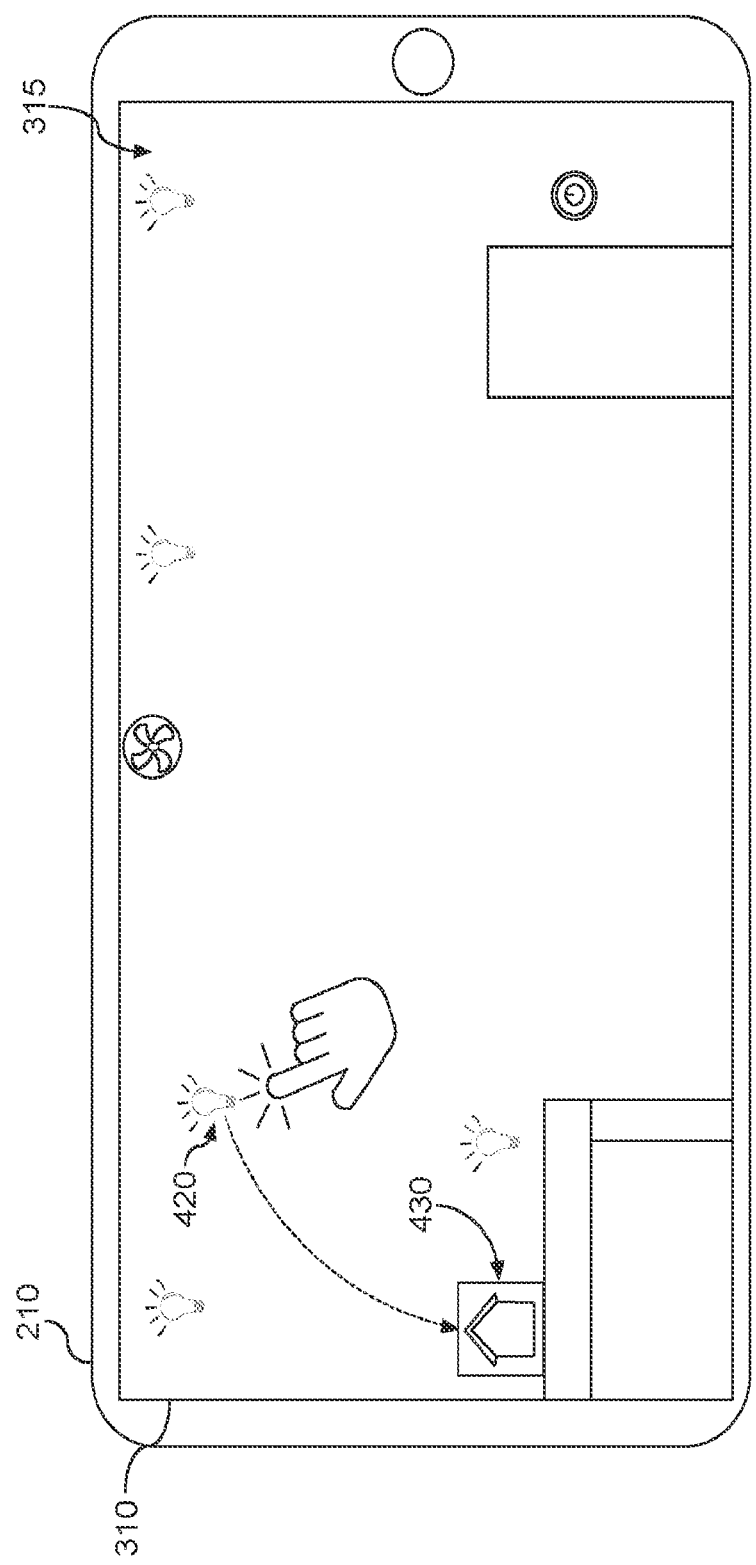
FIG. 4 depicts an example user input indicative of a pairing intention according to example embodiments of the present disclosure.

The user interface 310 can help facilitate the pairing of devices within the environment. FIG. 4 depicts an example user input 410 indicative of a pairing intention according to example embodiments of the present disclosure. For example, the user device 130 can receive user input 410 indicative of a pairing intention of a first device 420 of the plurality of devices and a second device 430 of the plurality of devices. The user input 410 indicative of a pairing intention of the first device 420 of the plurality of devices and the second device 430 of the plurality of devices can include input to a first device representation within the virtual representation 315 of the environment indicative of the first device 420 and/or an input to a second device representation within the virtual representation 315 of the environment indicative of the second device 430.

The user input 410 can include input indicative of intended association of the first device 420 and the second device 430. For example, the user device 130 can include one or more input devices such as, for example, touch screens, one or more buttons, microphones, etc. A user input 410 can include a selection of the first device 420 and the second device 430. For example, the user input 410 can include a first input identifying the first device representation associated with the first device 420 and a second input identifying the second device representation associated with the second device 430. The first and second input can include, for example, one or more interactions with the user device 130. By way of example, the first and second input can include an audible input received by a microphone, a tactile input (e.g., touch input) received by a touch screen, interactive button, etc. In some implementations, the user input 410 can include a touch input to the user-interface 310. For instance, the user input 410 can include a drag and drop motion across the user-interface 310. By way of example, the user input 410 can include a continuous touch input beginning at the first device 420 and ending at the second device 430. The user input 410 can grab and drag the first device representation until it at least partially overlaps with the second device representation (e.g., by maintaining touch contact with the touch screen until the second device representation is reached, etc.). The user input 410 can drop the first device representation on the second device representation (e.g., by ceasing touch contact, etc.). This motion, for example, can signify an intention to pair the first device 420 with the second device 430. In this manner, the present disclosure provides an augmented reality user-interface 310 that allows an installer to easily pair devices using a simple user-interaction, such as a drag-and-drop interaction.

The user device 130 can initiate a pairing operation between the first device 420 and the second device 430 based, at least in part, on the user input 410 indicative of the pairing intention of the first device 420 of the plurality of devices and the second device 430 of the plurality of devices. For example, the user device 130 can obtain at least one of a first communication data associated with the first device 420 and/or a second communication data associated with the second device 430. Communication data associated with a respective device, for example, can include information indicative of the respective device such as a unique device identifier, authorization data, etc. By way of example, the communication data can include an identification code for the first device 420 and/or the second device 430 that the first device 420 can use to establish communications between the first device 420 and the second device 430.

The user device 130 can initiate the pairing operation by communicating with the first device 420, the second device 430, and/or one or more remote servers. For example, in some implementations, the user device 130 can provide at least one of first pairing instructions to the first device 420 and/or second pairing instructions to the second device 430. By way of example, the first pairing instructions can be indicative of the second communication data associated with the second device 430 and a request to pair with the second device 430. Moreover, the second pairing instructions can be indicative of the first communication data associated with the first device 420 and a request to pair with the first device 420.

In addition, or alternatively, the user device 130 can provide a pairing request to a remote server communicatively connected to the user device 130. The pairing request can include data indicative of the intended pairing operation between the first device 420 and the second device 430. The remote server can be communicatively connected to at least one of the first device 420 and/or the second device 430. In this manner, the remote server can obtain communication data associated with at least one of the first device 420 and/or the second device 430 and initiate the pairing operation between the first device 420 and the second device 430.

In some implementations, the user device 130 can initiate a termination operation between the first device 420 and the second device 430 based, at least in part, on user input indicative of an intention to terminate the paired relationship between the first device 420 and the second device 430. By way of example, the user device 130 can receive and store data indicative of one or more paired relationships between each of the plurality of devices in the environment. The user device 130 can receive user input (e.g., touch input, audio input, etc.) indicative of an intention to terminate a respective paired relationship between at least two of the plurality of devices. For example, the user input indicative of an intention to terminate the paired relationship between the first device 420 and the second device 430 can include a different style of input relative to the user input indicative of a pairing intention. For instance, the user input indicative of a pairing intention can include a drag and drop interaction, whereas the user input indicative of a termination intention can include a simple swipe interaction across either the first device representation or the second device representation. In addition, or alternatively, the user input indicative of the termination intention and the user input indicative of the pairing intention can include the same style of input. For instance, a drag and drop interaction between the first device 420 and the second device 430 can be indicative of a pairing intention when a paired relationship between the first device 420 and the second device 430 does not exist. In some implementations, the same interaction can be indicative of a termination intention when a paired relationship between the first device 420 and the second device 430 is already in existence.

By way of example, in some implementations, the user device 130 can receive confirmation data indicative of a completed pairing operation between the first device 420 and the second device 430. For example, the confirmation data can be indicative of a communicative connection between the first device 420 and the second device 430. The completed pairing operation can be received from the first device 420, the second device 430, and/or one or more remote servers. For example, the first device 420 can receive the first pairing instructions from the user device 410 and, in response, can establish a communication channel with the second device 420 and provide confirmation data indicative of the paired relationship to the user device 130. In addition, or alternatively, the user device 130 can receive the confirmation data from one or more remote servers in response to providing the one or more remote servers with a pairing request.

The user device 130 can provide, for display, an indication of the confirmation data within the user-interface 310. For example, the confirmation data can be presented within the virtual environment 315 presented by the user-interface 310. By way of example, the user device 130 can modify the device representation associated with the first device 420, the second device 430, or both, to highlight the paired relationship between the first device 420 and the second device 430 (e.g., a displayable paired list of devices, a line/arrow element between the two devices, color/pattern/shading coding of the devices, etc.). In this manner, a user of the user device 130 can visualize and interact with the paired relationship between the first device 420 and the second device 430 via the user-interface 310. For instance, the user device 130 can receive user input associated with the indication of the confirmation data. In response, the user device 130 can initiate one or more actions. By way of example, in some implementations, the user device 130 can initiate a termination operation between the first device 420 and the second device 430. For example, the termination operation can initiate the termination of the communicative connection between the first device 420 and the second device 430.

Figure 5:
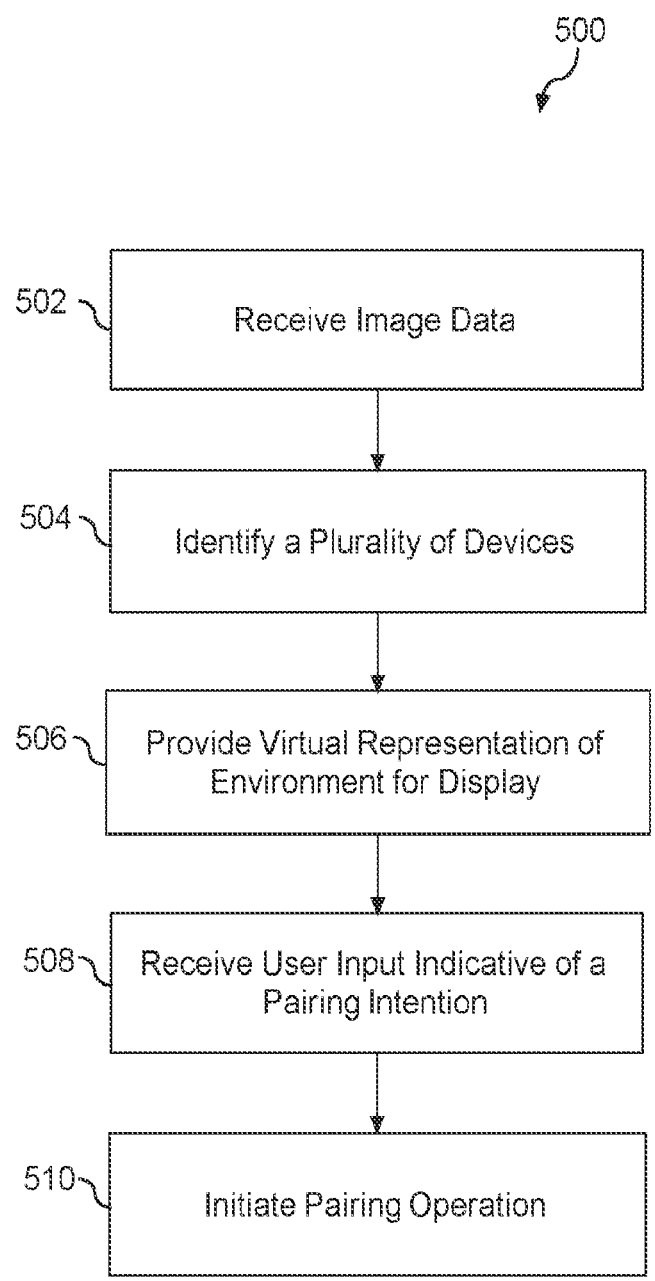
FIG. 5 depicts a flow diagram of a method for pairing a first device and a second device according to example embodiments of the present disclosure.

FIG. 5 depicts a flow diagram of a method 500 for pairing a first device and a second device according to example embodiments of the present disclosure. The method 500 can be implemented, for instance, using user device 130, one or more aspects of the computing environment 200 of FIG. 2, one or more aspects of system 800 of FIG. 8, and/or one or more aspects of another figure. Moreover, one or more portion(s) of the method 500 can be implemented as an algorithm on the hardware components of the device(s) described herein (e.g., as in FIGS. 1-4 and 8) to, for example, pair devices within an environment. FIG. 5 depicts steps performed in a particular order for purposes of illustration and discussion. Those of ordinary skill in the art, using the disclosure provided herein, will understand that various steps of any of the methods described herein can be omitted, expanded to include other steps, performed simultaneously, rearranged, and/or modified in various ways without deviating from the scope of the present disclosure.

At (502), the method 500 can include receiving image data. For instance, a computing system (e.g., user device 130, device(s) 120, server(s) 230, etc.) can receive the image data. In some implementations, the computing system can include an image capturing device (e.g., camera, etc.) configured to capture the image data. In this manner, the computing system can receive image data indicative of an environment. For example, the image data can include one or more images depicting the environment and/or one or more of a plurality of devices within the environment.

At (504), the method 500 can include identifying a plurality of devices. For instance, a computing system (e.g., user device 130, device(s) 120, server(s) 230, etc.) can identify the plurality of devices. For example, the computing system can identify a plurality of devices physically located in the environment. The plurality of devices, for example, can include at least one or more of a switch, luminary, ceiling fan, media device, audio device, cleaning device, and/or a smart hub. By way of example, the computing system can include a location-based resource configured to receive user location data associated with the computing system. In addition, each respective device of the plurality of devices can be associated with device data indicative of one or more device features and/or a device location. The computing system can obtain the device data associated with each respective device of the plurality of devices and identify the plurality of devices physically located in the environment based, at least in part, on the user location data and the device data associated with each respective device of the plurality of devices.

For example, the computing system can include a communication interface configured to communicate with one or more remote servers. The device data for each respective device of the plurality of devices can be stored on the one or more remote servers. In addition, or alternatively, a user device can include one or more input devices. The device data for each respective device of the plurality of devices can be previously received via user input at the user device. For example, in some implementations, the computing system can receive, via a camera configured with a user device, device image data indicative of a respective device of the plurality of devices. The computing system can determine the device data for the respective device based, at least in part, on the device image data for the respective device of the plurality of devices, as, for example, described herein.

At (506), the method 500 can include providing a virtual representation of the environment for display. For instance, a computing system (e.g., user device 130, device(s) 120, server(s) 230, etc.) can provide the virtual representation of the environment for display. For example, the computing system can provide, for display, data indicative of a user interface. The user interface can present the virtual representation of the environment. In addition, or alternatively, the user interface can present a device representation for each respective device of the plurality of devices within the virtual representation of the environment. For example, the virtual representation of the environment can include a device representation for each respective device of the plurality of devices.

At (508), the method 500 can include receiving user input indicative of a pairing intention. For instance, a computing system (e.g., user device 130, device(s) 120, server(s) 230, etc. can receive the user input. For example, the computing system can receive user input indicative of a pairing intention of a first device of the plurality of devices and a second device of the plurality of devices. The user input indicative of the pairing intention of the first device of the plurality of devices and the second device of the plurality of devices can include a first touch input to a first device representation within the virtual representation of the environment associated with the first device and a second touch input to a second device representation within the virtual representation of the environment associated with the second device. By way of example, the user input can include a drag and drop motion across the user interface. The drag and drop motion can begin with the first device representation and end on the second device representation.

At (510), the method 500 can include initiating a pairing operation. For instance, a computing system (e.g., user device 130, device(s) 120, server(s) 230, etc.) can initiate the pairing operation. For example, the computing system can initiate a pairing operation between the first device and the second device based, at least in part, on the user input indicative of the pairing intention of the first device of the plurality of devices and the second device of the plurality of devices. In this regard, the computing system can obtain at least one of first communication data associated with the first device and/or second communication data associated with the second device. The computing system can provide at least one of first pairing instructions indicative of the second communication data to the first device or second pairing instructions indicative of the first communication data to the second device. In addition, or alternatively, the computing system can provide a pairing request indicative of the pairing operation between the first device and the second device to a remote server communicatively connected to at least one of the first device and the second device.

In addition, in some implementations, the computing system can receive confirmation data indicative of a completed pairing operation between the first device and the second device. For example, the confirmation data can be indicative of a communicative connection between the first device and the second device. The computing system can provide, for display, an indication of the confirmation data within the user interface. In addition, the computing system can receive user input associated with the indication of the confirmation data. The computing system can initiate a termination operation between the first device and the second device in response to the user input. For example, the termination operation can initiate a termination of the communicative connection between the first device and the second device.

Figure 6:
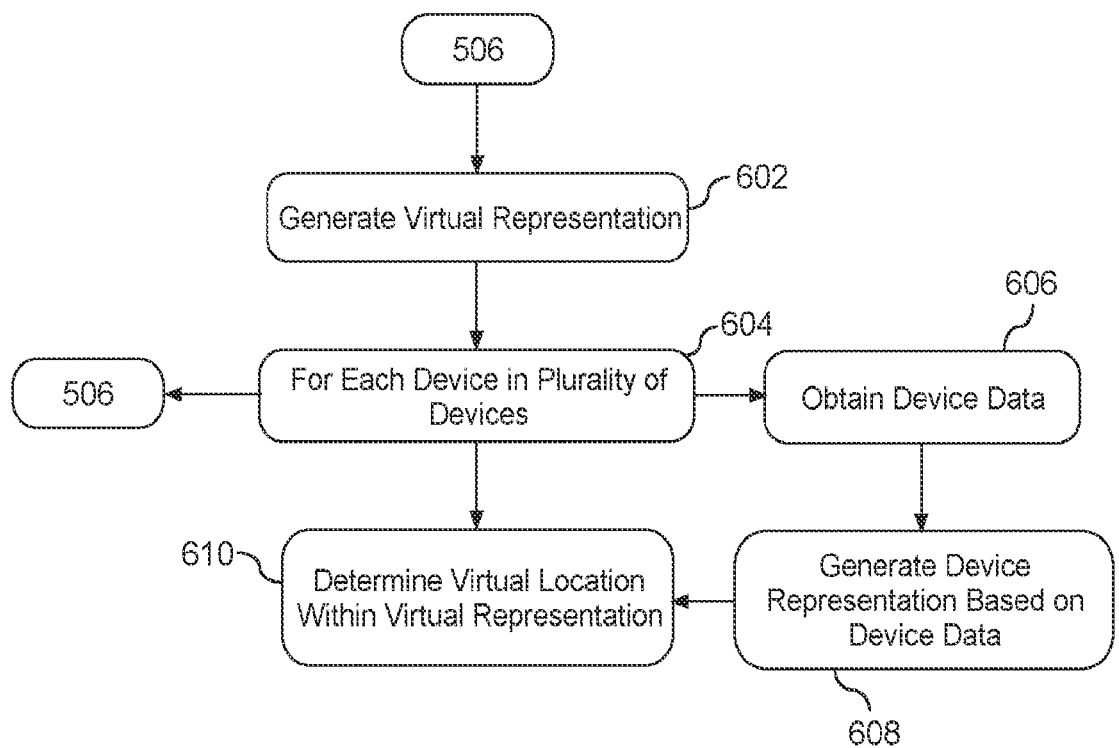
FIG. 6 depicts a flow diagram of a method for generating a virtual representation according to example embodiments of the present disclosure.

FIG. 6 depicts a flow diagram of a method 600 for generating a virtual representation according to example embodiments of the present disclosure. The method 600 can be implemented, for instance, using user device 130, one or more aspects of the computing environment 200 of FIG. 2, one or more aspects of system 800 of FIG. 8, and/or one or more aspects of another figure. HG. 6 depicts steps performed in a particular order for purposes of illustration and discussion. Moreover, one or more portion(s) of the method 600 can be implemented as an algorithm on the hardware components of the device(s) described herein (e.g., as in FIGS. 1-4 and 8) to, for example, pair devices within an environment. Those of ordinary skill in the art, using the disclosure provided herein, will understand that various steps of any of the methods described herein can be omitted, expanded to include other steps, performed simultaneously, rearranged, and/or modified in various ways without deviating from the scope of the present disclosure.

Method 600 begins at (506) of method 500 whereby a computing system (e.g., user device 130, server 240, etc.) provides a virtual representation for display. The method 600 can include generating a user interface for display. For example, the user interface can present a virtual representation of the environment including a device representation for each respective device of the plurality of devices identified within the environment.

More specifically, at (602), the method 600 can include generating a virtual representation. For instance, a computing system (e.g., user device 130, device(s) 120, server(s) 230, etc.) can generate the virtual representation. The computing system can generate a virtual representation of the environment based, at least in part, on the image data, as described herein. In some implementations, the virtual representation can include a device representation for each respective device of the plurality of devices physically located in the environment.

At (604), the method 600 can include generating a device representation for each device in the plurality of devices. For instance, a computing system (e.g., user device 130, device(s) 120, server(s) 230, etc.) can generate the device representation for each device in the plurality of devices. For example, the computing system can generate the device representation for each respective device of the plurality of devices based, at least in part, on device data associated with each respective device.

To do so, at (606) the method can include obtaining device data. For instance, a computing system (e.g., user device 130, device(s) 120, server(s) 230, etc.) can obtain the device data. For example, as discussed herein, each respective device of the plurality of devices can be associated with device data indicative of one or more device features. The computing system can obtain the device data from each of the plurality of devices, one or more remote servers, a user device, etc.

At (608), the method 600 can include generating a device representation for a respective device based on the device data for the respective device. For instance, a computing system (e.g., user device 130, device(s) 120, server(s) 230, etc.) can generate the device representation for the respective device based, at least in part, on the device data for the respective device. As described herein, the device representation can be a visual representation that is formed to be representative of the type of device (e.g., a graphical/pictorial representation of a light bulb, switch, lamp, etc.).

At (610), the method 600 can include determining a virtual location within the virtual representation. For instance, a computing system (e.g., User device 130, device(s) 120, server(s) 230, etc.) can determine the virtual location within the virtual representation for the respective device. For example, the device data for each respective device of the plurality of devices can include location data associated with the respective device. The device representation for a respective device can be provided for display at a virtual position within the virtual representation of the environment based, at least in part, on the location data associated with the respective device. For example, the virtual position can be indicative of a relative position within the virtual representation that at least partially mirrors the physical location of the respective device.

Figure 7:
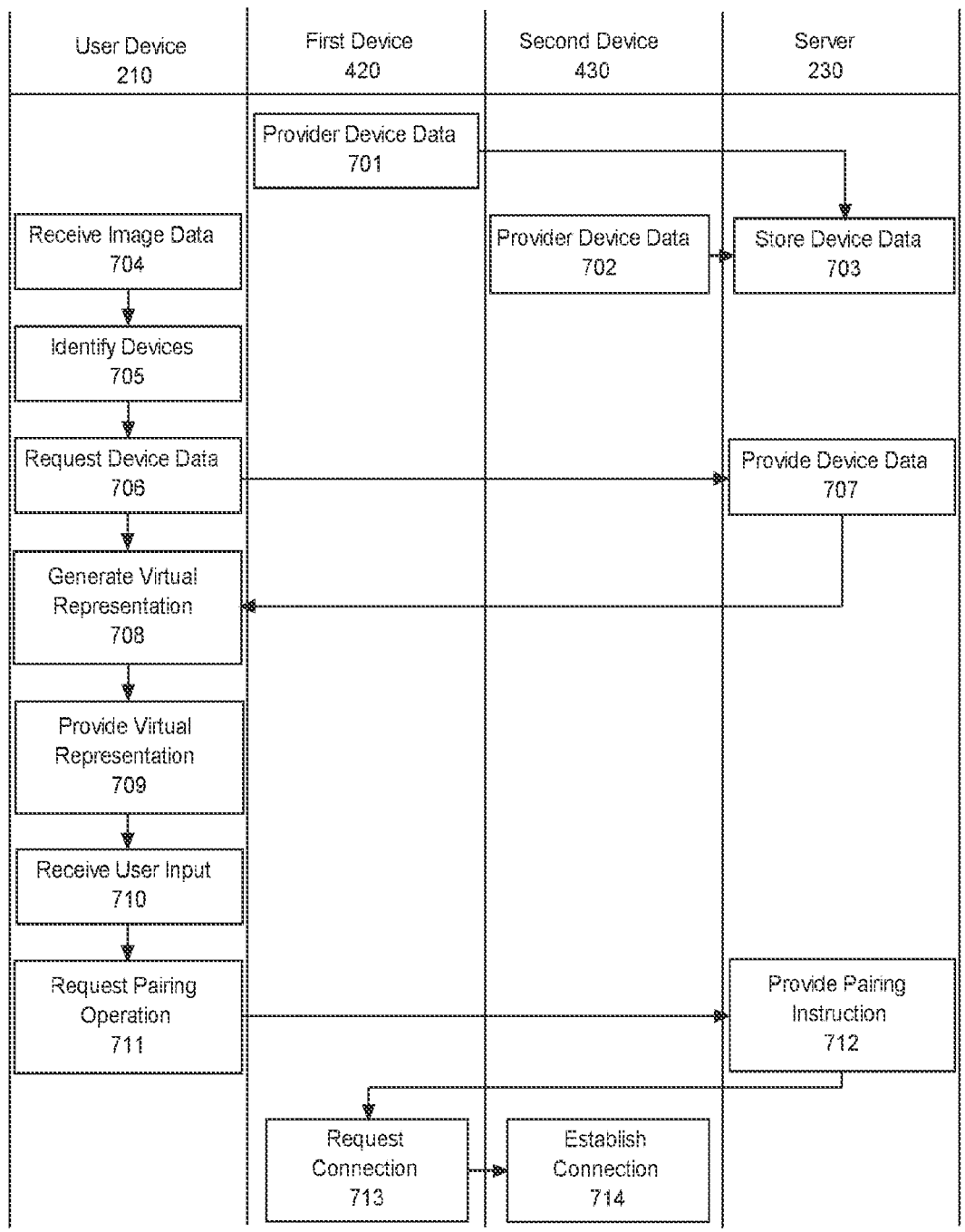
FIG. 7 depicts a system flow diagram for pairing a first device and a second device according to example embodiments of the present disclosure.
Figure 8:
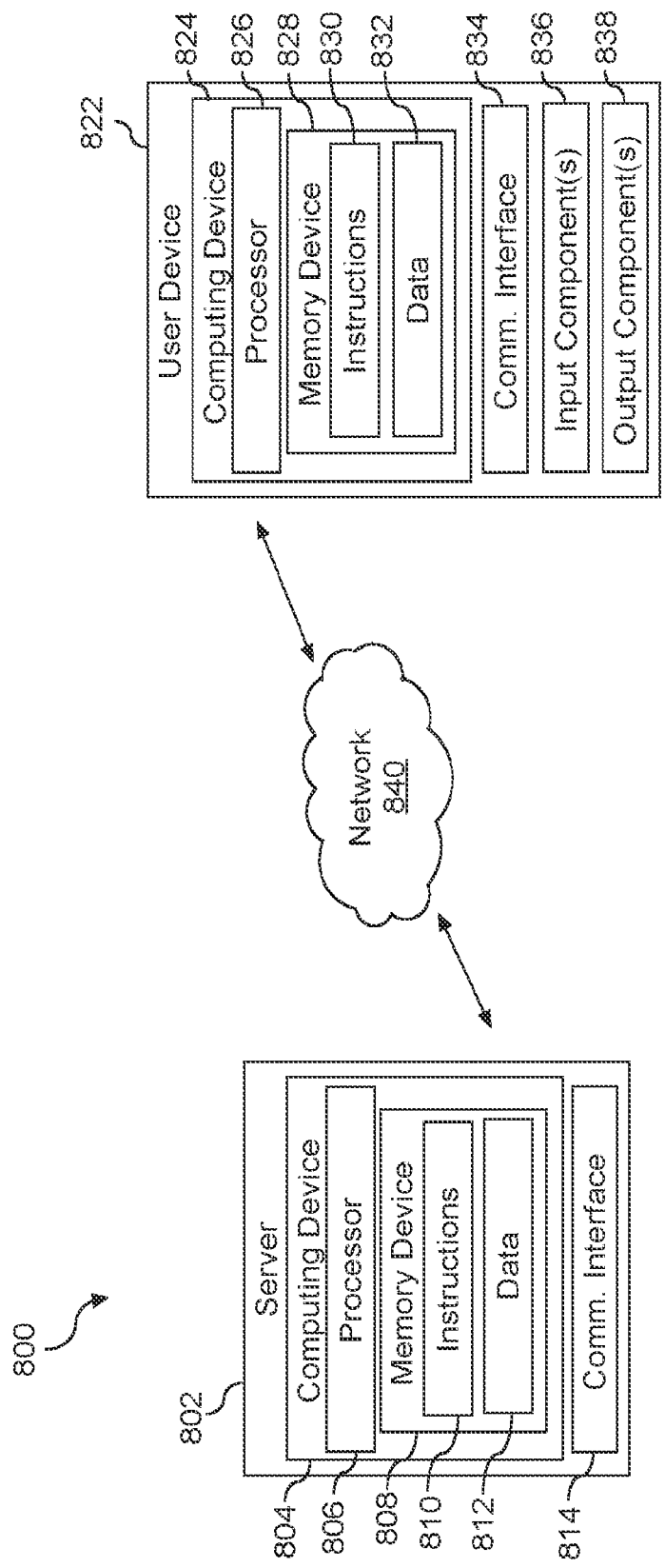
FIG. 8 depicts an example system according to example embodiments of the present disclosure.

FIG. 7 depicts a system flow diagram 700 for pairing a first device and a second device according to example embodiments of the present disclosure. The system flow diagram 700 can be implemented, for instance, using user device 130, a first device 420, a second device 430, and/or a server 230 and/or other hardware. Moreover, one or more portion(s) of the method 600 can be implemented as an algorithm on the hardware components of the device(s) described herein (e.g., as in FIGS. 1-4 and 8) to, for example, pair devices within an environment. FIG. 7 depicts steps performed in a particular order by particular devices for purposes of illustration and discussion. Those of ordinary skill in the art, using the disclosure provided herein, will understand that the various steps described herein can be performed by any device included in system 200 as depicted by FIG. 2, system 800 as depicted by FIG. 8, and/or components of another figure. Moreover, any step can be omitted, expanded to include other steps, performed simultaneously, rearranged, and/or modified in various ways without deviating from the scope of the present disclosure.

The system flow diagram 700 illustrates just one implementation possible to pair two devices.

At steps (701) and (702), the first device 420 and the second device 430, respectively, can provide device data to the server 230. In response, at (703) the server 230 can store the device data in one or more memory devices of the server 230. At (704), the user device 130 can receive image data of an environment. At (705), the user device can identify a plurality of devices within the environment. At (706), the user device can request device data from server 230. In response, at (707), the server can provide device data to user device 130.

At (708), the user device 130 can generate a virtual representation of the environment and a plurality of device representations indicative of the plurality of devices within the environment. At (709), the user device 130 can provide the virtual representation for display via, for example, a display device of the user device 130. At (710), the user device 130 can receive user input indicative of an intention to pair the first device 420 and the second device 430.

At (711), the user device 130 can request a pairing operation of the first device 420 and the second device 430 from the server 230. In response, at (712), the server 230 can provide pairing instructions to the first device 420. The first device 420 can receive the pairing instructions from the server 230 and, in response, at (713), request a connection with the second device 430. At (714), the second device 714 can receive the pairing instructions and establish a communicative connection with the first device 420.

FIG. 8 depicts an example computing system 800 that can be used to implement the systems and methods for pairing smart devices according to example embodiments of the present disclosure. The system 800 can be implemented using a client-server architecture that includes one or more servers 802 and a user devices 822 which can act as a client of one or more of the servers 802, Servers 802 can correspond to servers 230, as described herein with reference to FIGS. 2 and 7. For example, servers 802 can include one or more cloud computing devices, one or more remote memory devices, and/or the like. User device 822 can correspond, for example, to a user device 130, as described herein with reference to FIGS. 2 and 7. For example, user device 822 can include a personal communication device, a smartphone, desktop computer, laptop, mobile device, tablet, wearable computing device, and/or the like.

Each of the servers 802 and user device 822 can include at least one computing device, such as depicted by server computing device 804 and user computing device 824. Although only one server computing device 804 and one user computing device 824 are illustrated in FIG. 8, multiple computing devices optionally can be provided at one or more locations for operation in sequential configurations or parallel configurations to implement the disclosed methods and systems for pairing smart devices. In other examples, the system 800 can be implemented using other suitable architectures, such as a single computing device.

Each of the computing devices 804, 824 in system 800 can be any suitable type of computing device. For example, computing devices 804, 824 can include a general purpose computer, special purpose computer, and/or other suitable computing device. Computing device 824 can include, for instance, location resources, a GPS, and/or other suitable device.

The computing devices 804 and/or 824 can respectively include one or more processor(s) 806, 826 and one or more memory devices 808, 828. The one or more processor(s) 806, 826 can include any suitable processing device, such as a microprocessor, microcontroller, integrated circuit, logic device, one or more central processing units (CPUs), graphics processing units (GPUs) dedicated to efficiently rendering images or performing other specialized calculations, and/or other processing devices. The one or more memory devices 808, 828 can include one or more computer-readable media, including, but not limited to, non-transitory computer-readable media, RAM, ROM, hard drives, flash drives, or other memory devices. In some examples, memory devices 808, 828 can correspond to coordinated databases that are split over multiple locations.

The one or more memory devices 808, 828 can store information accessible by the one or more processors 806, 826, including instructions 810, 830 that can be executed by the one or more processors 806, 826. For instance, server memory device 808 can store instructions for pairing one or more smart devices as disclosed herein. The user memory device 828 can store instructions for implementing a user interface that allows a user to visualize and interact with an environment including a plurality of smart devices.

The one or more memory devices 808, 828 can also include data 812, 832 that can be retrieved, manipulated, created, or stored by the one or more processors 806, 826. The data 812 stored at server 802 can include, for instance, device data such as, for example, device attributes, communication data, etc. associated with each respective device of a plurality of smart devices. The data 832 stored at user device 822 can include, for example, image data, device data, etc. Data 812 and data 832 can include the same, similar, and/or different data.

Computing devices 804 and 824 can communicate with one another over a network 840. In such instances, the server 802 and the user device 822 can also respectively include a network interface (e.g., communication interface 814 and 834, respectively) used to communicate with one another over network 840. The network interface(s) can include any suitable components for interfacing with one more networks, including for example, transmitters, receivers, ports, controllers, antennas, or other suitable components. The network 840 can be any type of communications network, such as a local area network (e.g. intranet), wide area network (e.g. Internet), cellular network, or some combination thereof. The network 840 can also include a direct connection between server computing device 804 and user computing device 824. In general, communication between the server computing device 804 and user computing device 824 can be carried via the network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

User device 822 can include various input/output devices for providing and receiving information to/from a user. For instance, input device(s) 836 can include devices such as a touch screen, touch pad, data entry keys, and/or a microphone suitable for voice recognition. Output device(s) 838 can include audio or visual outputs such as speakers or displays for providing, for instance, a virtual representation of an environment including a plurality of smart devices.

The technology discussed herein makes reference to servers, databases, software applications, and other computer-based systems, as well as actions taken, and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel. Furthermore, computing tasks discussed herein as being performed at a server can instead be performed at a user device. Likewise, computing tasks discussed herein as being performed at the user device can instead be performed at the server.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for pairing devices comprising:
   receiving, by one or more computing devices, image data indicative of an environment from a camera configured to capture the image data;
   identifying, by the one or more computing devices, a plurality of devices physically located in the environment;
   receiving, by the one or more computing devices, location data via a location-based resource, wherein the location data includes user location data;
   generating, by the one or more computing devices, a virtual representation of the environment based, at least in part, on the image data, wherein the virtual representation comprises a device representation for each respective device of the plurality of devices physically located in the environment;
   providing for display, by the one or more computing devices via a display device, data indicative of a user interface, the user interface presenting the virtual representation of the environment;
   receiving, by the one or more computing devices, user input indicative of a pairing intention of a first device of the plurality of devices and a second device of the plurality of devices, wherein the user input includes a drag and drop motion across the user interface;
   initiating, by the one or more computing devices, a pairing operation between the first device and the second device based, at least in part, on the user input indicative of the pairing intention of the first device of the plurality of devices and the second device of the plurality of devices, wherein the pairing operation includes providing a pairing request indicative of the pairing operation between the first device and the second device to a remote server communicatively connected to at least one of the first device and the second device;
   receiving, by the one or more computing devices, confirmation data indicative of a completed pairing operation between the first device and the second device and displaying an indication of the confirmation data within the user interface wherein the confirmation data is indicative of a communicative connection between the first device and the second device, and
   receiving, by the one or more computing devices, user input associated with a termination operation and initiate the termination operation between the first device and the second device, wherein the termination operation initiates a termination of the communicative connection between the first device and the second device,
   wherein each respective device of the plurality of devices is associated with device data indicative of one or more device features and a device location,
   wherein identifying the plurality of devices physically located in the environment includes obtaining the device data associated with each respective device of the plurality of devices, and identifying the plurality of devices physically located in the environment based, at least in part, on the user location data and the device data associated with each respective device of the plurality of devices, and
   wherein the plurality of devices comprise at least one or more of a switch, a luminary, a ceiling fan, a media device, a audio device, a cleaning device, or a smart hub.

2. The computer-implemented method of claim 1, wherein the device data indicative of one or more device features includes device functionalities.

3. The computer-implemented method of claim 2, wherein providing for display, by the one or more computing devices via the display device, data indicative of the user interface comprises:
   generating, by the one or more computing devices, the device representation for each respective device of the plurality of devices based, at least in part, on the device data associated with each respective device; and
   providing for display, by the one or more computing devices via the display device, the data indicative of the user interface, the user interface presenting the device representation for each respective device of the plurality of devices within the virtual representation of the environment.

4. The computer-implemented method of claim 3, wherein the device representation for each respective device is provided for display at a virtual position within the virtual representation of the environment based, at least in part, on the location data associated with the respective device.

5. The computer-implemented method of claim 1, wherein the drag and drop motion includes a continuous touch input beginning at the first device and ending at the second device.

6. The computer-implemented method of claim 1, wherein initiating, by the one or more computing devices, the pairing operation between the first device and the second device comprises:
   obtaining, by the one or more computing devices, at least one of first communication data associated with the first device or second communication data associated with the second device; and
   providing, by the one or more computing devices, at least one of first pairing instructions indicative of the second communication data to the first device or second pairing instructions indicative of the first communication data to the second device.

7. The computer-implemented method of claim 1, wherein the remote server obtains communication data associated with the first device and the second device.

8. The computer-implemented method of claim 1, the confirmation data indicative of a completed pairing operation is provided by the remote server.

9. The computer-implemented method of claim 1, wherein the confirmation data indicative of a completed pairing operation is provided by at least one of the first device or the second device.

10. The computer-implemented method of claim 9, the user input associated with a termination operation includes a swiping motion.

11. A user device comprising:
one or more processors;
a camera configured to capture image data; and
a location-based resource configured to receive user location data associated with the user device;
a display device; and
one or more tangible, non-transitory, computer readable media that collectively store instructions that when executed by the one or more processors cause the user device to perform an operation configured to,
receive image data indicative of an environment,
identify a plurality of devices physically located in the environment,
generate a virtual representation of the environment based, at least in part, on the image data,
provide for display, via the display device, data indicative of a user interface, the user interface presenting the virtual representation of the environment, wherein the virtual representation comprises a device representation for each respective device of the plurality of devices physically located in the environment,
receive user input indicative of a pairing intention of a first device of the plurality of devices and a second device of the plurality of devices, wherein the user input comprises a drag and drop motion across the user interface,
initiate a pairing operation between the first device and the second device based, at least in part, on the user input indicative of the pairing intention of the first device of the plurality of devices and the second device of the plurality of devices, wherein the pairing operation includes providing a pairing request indicative of the pairing operation between the first device and the second device to a remote server communicatively connected to at least one of the first device and the second device, wherein the confirmation data is indicative of a communicative connection between the first device and the second device,
receive confirmation data indicative of a completed pairing operation between the first device and the second device and displaying an indication of the confirmation data within the user interface, and
receive user input associated with a termination operation and initiate the termination operation between the first device and the second device, wherein the termination operation initiates a termination of the communicative connection between the first device and the second device,
wherein each respective device of the plurality of devices is associated with device data indicative of one or more device features and a device location,
wherein identifying the plurality of devices physically located in the environment includes obtaining the device data associated with each respective device of the plurality of devices, and identifying the plurality of devices physically located in the environment based, at least in part, on the user location data and the device data associated with each respective device of the plurality of devices, and
wherein the plurality of devices comprise at least one or more of a switch, a luminary, a ceiling fan, a media device, a audio device, a cleaning device, or a smart hub.

12. The user device of claim 11, wherein the location-based resource includes a global positioning sensor.

13. The user device of claim 11 further comprising
a communication interface configured to communicate with one or more remote servers,
wherein the device data for each respective device of the plurality of devices is stored on the one more remote servers.

14. The user device of claim 3, wherein the device data for each respective device of the plurality of devices is previously received via user input at the user device.

15. The user device of claim 11,
wherein the operation includes receiving, via the camera, device image data indicative of a respective device of the plurality of devices, and
determining the device data for the respective device based, at least in part, on the device image data for the respective device of the plurality of devices.

16. A system for pairing smart devices comprising:
one or more processors;
a camera configured to capture image data; and
a location-based resource configured to provide location data;
a display device; and
one or more tangible, non-transitory, computer readable media that collectively store instructions that when executed by the one or more processors cause the user device to perform an operation configured to,
receive image data indicative of an environment,
identify a plurality of devices physically located in the environment,
generate a virtual representation of the environment based, at least in part, on the image data,
provide for display, via the display device, data indicative of a user interface, the user interface presenting the virtual representation of the environment, wherein the virtual representation comprises a device representation for each respective device of the plurality of devices physically located in the environment,
receive user input indicative of a pairing intention of a first device of the plurality of devices and a second device of the plurality of devices, wherein the user input comprises a drag and drop motion across the user interface,
initiate a pairing operation between the first device and the second device based, at least in part, on the user input indicative of the pairing intention of the first device of the plurality of devices and the second device of the plurality of devices, wherein the pairing operation includes providing a pairing request indicative of the pairing operation between the first device and the second device to a remote server communicatively connected to at least one of the first device and the second device,
receive confirmation data indicative of a completed pairing operation between the first device and the second device and displaying an indication of the confirmation data within the user interface wherein the confirmation data is indicative of a communicative connection between the first device and the second device, and receive user input associated with a termination operation and initiate the termination operation between the first device and the second device, wherein the termination operation initiates a termination of the communicative connection between the first device and the second device, wherein each respective device of the plurality of devices is associated with device data indicative of one or more device features and a device location, wherein identifying the plurality of devices physically located in the environment includes obtaining the device data associated with each respective device of the plurality of devices, and identifying the plurality of devices physically located in the environment based, at least in part, on the location data and the device data associated with each respective device of the plurality of devices, and wherein the plurality of devices comprise at least one or more of a switch, a luminary, a ceiling fan, a media device, a audio device, a cleaning device, or a smart hub.

17. The system of claim 16, wherein the camera and the display device are part of a hand-held user device.

18. The system of claim 17, wherein the device data for each respective device of the plurality of devices is previously received via user input at the user device.

19. The system of claim 16, wherein the user input associated with a termination operation includes a swiping motion.

20. The system of claim 16, wherein the operation includes receiving, via the camera, device image data indicative of a respective device of the plurality of devices, and determining the device data for the respective device based, at least in part, on the device image data for the respective device of the plurality of devices.

* * * * *